United States Patent Office 2,938,912
Patented May 31, 1960

2,938,912
CONDENSATION PRODUCTS OF SUGAR ACID LACTONES WITH ARYL HALIDES

Carl B. Linn, Riverside, and Jerome A. Vesely, Park Ridge, Ill., assignors, by mesne assignments, to Universal Oil Products Company, Des Plaines, Ill., a corporation of Delaware No Drawing. Filed May 9, 1957, Ser. No. 658,003

16 Claims. (Cl. 260—343.6)

This application is a continuation-in-part of our co-pending application Serial No. 450,221, filed August 16, 1954, now abandoned.

This invention relates to a new and useful process for condensing sugar acid lactones with aryl halides in the presence of a Friedel-Crafts metal halide catalyst and to the products or novel compositions of matter formed by said condensation. The organic products formed by our condensation of sugar acid lactones with aryl halides are useful per se, and are also useful as intermediates in the manufacture of detergents, pharmaceuticals, surface coatings, resins, gelling agents, and the like. For example, the lactone of 1,1-di-chlorophenyl-1-desoxy-glucuronic acid, formed by the condensation of glucuronolactone with chlorobenzene, can be converted into a so-called sugar detergent by ester exchange with methyl laurate, methyl myristate, methyl palmitate, methyl oleate, or methyl stearate. These ester exchange reactions, as described in Industrial & Engineering Chemistry 48, 1459–1464 (1956), are preferably carried out in dimethylformamide solution utilizing potassium carbonate or sodium methoxide as the catalysts. As is observable from this publication, the preparation of detergents from sugar derivatives may be carried out readily by one skilled in the art.

More specifically, this invention relates to a process for producing haloaryl-substituted polyhydroxy carboxylic acids, and salts and lactones thereof. These lactones are internal esters of said polyhydroxy carboxylic acids, formed by the loss of water by interaction of a hydroxyl group with the carboxylic acid group of a given molecule of a polyhydroxy carboxylic acid, with the resultant formation of furanose or pyranose ring systems or lactones.

An object of this invention is to condense an aryl halide with a lactone of a sugar acid in the presence of a Friedel-Crafts metal halide catalyst, and to recover the products of said condensation.

Another object of this invention is to condense an aryl halide with glucuronolactone, and to recover the product of said condensation.

A still further object of this invention is to condense chlorobenzene with glucuronolactone, and to recover the product of said condensation.

One embodiment of this invention relates to a process which comprises condensing an aryl halide with a lactone of a sugar acid in the presence of a Friedel-Crafts metal halide catalyst, and recovering the resultant condensation product.

Another embodiment of this invention relates to a process which comprises condensing an aryl halide with a lactone of a sugar acid in the presence of an aluminum chloride catalyst, and recovering the resultant condensation product.

Still another embodiment of this invention relates to a process which comprises condensing chlorobenzene with glucuronolactone in the presence of an aluminum chloride catalyst, and recovering the resultant condensation product.

A still further embodiment of this invention is a product produced by condensing chlorobenzene with glucuronolactone in the presence of aluminum chloride.

A still further embodiment of this invention is a member of the group consisting of a haloaryl-1-desoxy-alduronolactone, a haloaryl-1-desoxy-alduronic acid, and a sodium salt of a haloaryl-1-desoxy-alduronic acid.

We have found that useful water-soluble and water-insoluble condensation products are formed by reacting lactones of sugar acids with aryl halides in the presence of Friedel-Crafts metal halide catalysts, and particularly in the presence of aluminum chloride. These condensation reactions are carried out conveniently in ordinary glass alkylation equipment using temperatures of from about −20° C. to about 150° C., and preferably at temperatures of from about 20° C. to about 100° C. While many of the condensation reactions are carried out at substantially atmospheric pressure, it may be desirable in certain instances and with certain reactants to carry out the reaction in metal autoclaves at pressures up to 100 atmospheres or more. It is convenient in most instances to operate the equipment utilized at the pressure generated by the reaction mixture and catalyst contained therein at the temperature utilized.

Aryl halides suitable for use as starting materials in the process of this invention include the halogen derivatives of aromatic hydrocarbons in which there is retained at least one hydrogen atom attached to a carbon atom of the aromatic nucleus. Thus compounds such as hexachlorobenzene are excluded from the scope of the process of the present invention, since such compounds are inoperative. Aryl halides utilizable within the broad scope of the process of the present invention include fluorobenzene, chlorobenzene, bromobenzene, iodobenzene, ortho-chlorotoluene, meta-chlorotoluene, para-chlorotoluene, ortho-bromotoluene, meta-bromotoluene, para-bromotoluene, ortho-bromoanisole, para-bromoanisole, para-bromodimethylaniline, ortho-dichlorobenzene, para-dichlorobenzene, 1,2,4-trichlorobenzene, 1,2,3,4-tetrachlorobenzene, para-dibromobenzene, ortho-bromochlorobenzene, para-bromochlorobenzene, ortho-bromoiodobenzene, para-bromoiodobenzene, ortho-chloroiodobenzene, para-chloroiodobenzene, etc. Of course, the above enumerated haloaromatic compounds are not necessarily equivalent in the process of the present invention, and the conditions utilized for any particular one may be different from the conditions utilized with others. As stated hereinabove, of the aryl halides utilizable in the process of the present invention, aryl halides which are derivatives of aromatic hydrocarbons are preferred, and of these preferred aryl halides, those in which chlorine or bromine replaces one or more of nuclear hydrogen atoms of an aromatic ring of an aromatic hydrocarbon are still more particularly preferred. However, as stated hereinabove, the resultant aryl halide derivative of an aromatic hydrocarbon still contains at least one replaceable nuclear hydrogen atom. Such aryl halide derivatives of aromatic hydrocarbons include the chlorine or bromine derivatives of benzene, toluene, ortho-xylene, meta-xylene, para-xylene, ethylbenzene, 1,2,3-trimethylbenzene, 1,2,4-trimethylbenzene, ortho-ethyltoluene, meta-ethyltoluene, para-ethyltoluene, n-propylbenzene, isopropylbenzene or cumene, butyl benzenes, amyl benzenes, and higher molecular weight alkyl aromatic hydrocarbons in which the halogen atoms are substituted for one or more of the nuclear hydrogen atoms of the aromatic hydrocarbons but in which resultant aryl halides there remains at least one nuclear hydrogen atom attached to a carbon atom of the aromatic nucleus. Other suitable aryl halides include the nuclear halogen derivatives of alkylaromatic hydrocarbons with long chain alkyl groups, said alkylaromatic hydrocarbons being produced by the alkylation of aromatic hydrocarbons with olefin polymers to yield such materials as hexylbenzenes, hexyltoluenes, nonylbenzenes, nonyltoluenes, dodecylbenzenes, dodecyltoluenes, etc. Often alkylate suitable for halogenation to produce starting materials for the process of the present invention is obtained as a high boiling fraction in which the alkyl group attached to the aromatic hydrocarbon nucleus may contain from about 6 to about 24 carbon atoms. If any preference exists in the nuclear halogenated alkyl aromatic hydrocarbons for use in the process of the present invention, it is to those halogenated alkyl aromatic hydrocarbons in which the alkyl group contains from about 1 to about 5 carbon atoms. Other aryl halides for conversion with sugar acid lactones into novel compositions of matter include those with two or more aryl groups such as halogenated diphenyl, halogenated diphenyl methane, halogenated triphenyl methane, etc. Examples of suitable utilizable aryl halides which contain condensed benzene rings include chloronaphthalene, chloroanthracene, chlorophenanthrene, chloronaphthacene, chlororubrene, etc.

The sugar acid lactones which are utilizable as starting materials in the process of the present invention include both the alpha and beta forms of lyxuronolactone, xyluronolactone, arabinuronolactone, riburonolactone, taluronolactone, galacturonolactone, iduronolactone, guluronolactone, mannuronolactone, glucuronolactone, altruronolactone, alluronolactone, etc. These internal esters of alduronic acids are spontaneously formed upon heating suitable alduronic acids in which formation of a 1–4 or gamma-lactone structure is possible, or in which formation of a 1–5 or delta-lactone structure is possible. The alduronic acids are a group of compounds which are obtainable by oxidation of the terminal alcohol group of aldoses. The penturonic acids and their conversion to penturonolactones can be represented by the following general equation:

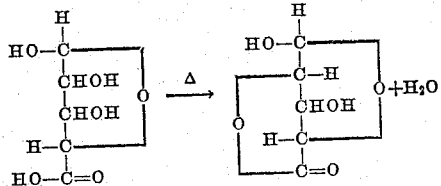

The hexuronic acids and their conversion to hexuronolactones can be represented by the following general equation:

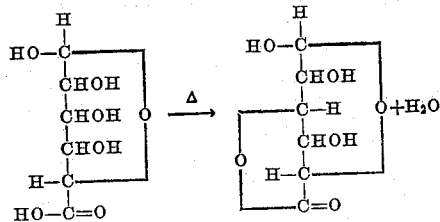

Since the alduronic acids must contain at least 5 carbon atoms to be able to form gamma-lactones, the sugar acid lactones which are preferred as starting materials in the process of this invention will contain at least 5 carbon atoms. Also utilizable are sugar acid lactones containing 6 carbon atoms and more. When these sugar acid lactones react with the aryl halides to form the new compositions of matter of the present invention, they do so by reaction at the number 1 carbon atom, thus forming haloaryl derivatives of lactones of 1-desoxy-uronic acids.

As an example of this process, glucuronolactone may be reacted with an equimolecular proportion or less of chlorobenzene to give a mono-(chlorophenyl)-desoxyglucuronic acid lactone or with more than an equimolecular proportion of chlorobenzene to give the lactone of di-(chlorophenyl)-desoxy-glucuronic acid. The structures of some of these haloaryl hexuronic acid lactone reaction products are represented as follows:

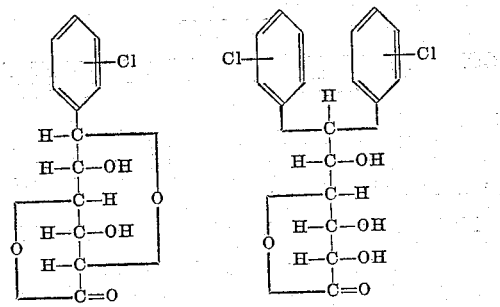

1-(chlorophenyl)-1-desoxy-glucuronolactone 1,1-di-(chlorophenyl)-1-desoxy-glucuronic acid lactone An example of our di-(haloaryl)-desoxy-hexuronic acid products is 1,1-di-(chlorophenyl)-1-desoxy-glucuronic acid represented by the following structural formula:

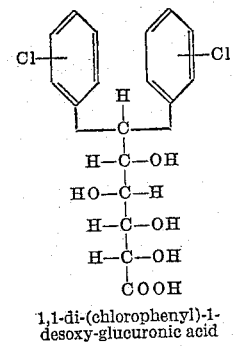

1,1-di-(chlorophenyl)-1-desoxy-glucuronic acid

Typical novel composition of matter or new compounds which are prepared in accordance with the process of the present invention include 1-(p-chlorophenyl)-1-desoxy-lyxuronolactone,
1,1-di-(p-chlorophenyl)-1-desoxy-lyxuronolactone
1-(p-chlorophenyl)-1-desoxy-xyluronolactone,
1,1-di-(p-chlorophenyl)-1-desoxy-xyluronolactone,
1-(p-chlorophenyl)-1-desoxy-arabinuronolactone,
1,1-di-(p-chlorophenyl)-1-desoxy-arabinuronolactone,
1-(p-chlorophenyl)-1-desoxy-riburonolactone,
1,1-di-(p-chlorophenyl)-1-desoxy-riburonolactone,
1-(p-chlorophenyl)-1-desoxy-taluronolactone,
1,1-di-(p-chlorophenyl)-1-desoxy-taluronolactone,
1-(p-chlorophenyl)-1-desoxy-galacturonolactone,
1,1-di-(p-chlorophenyl)-1-desoxy-galacturonolactone,
1-(p-chlorophenyl)-1-desoxy-iduronolactone,
1,1-di-(p-chlorophenyl)-1-desoxy-iduronolactone,
1-(p-chlorophenyl)-1-desoxy-guluronolactone,
1,1-di-(p-chlorophenyl)-1-desoxy-guluronolactone,
1-(p-chlorophenyl)-1-desoxy-mannuronolactone,
1,1-di-(p-chlorophenyl)-1-desoxy-mannuronolactone,
1-(p-chlorophenyl)-1-desoxy-glucuronolactone,
1,1-di-(p-chlorophenyl)-1-desoxy-glucuronolactone,
1-(p-chlorophenyl)-1-desoxy-altruronolactone,
1,1-di-(p-chlorophenyl)-1-desoxy-altruronolactone,
1-(p-chlorophenyl)-1-desoxy-alluronolactone,
1,1-di-(p-chlorophenyl)-1-desoxy-alluronolactone,
1-(p-bromophenyl)-1-desoxy-lyxuronolactone,
1,1-di-(p-bromophenyl)-1-desoxy-lyxuronolactone,
1-(p-bromophenyl)-1-desoxy-xyluronolactone,
1,1-di-(p-bromophenyl)-1-desoxy-xyluronolactone,
1-(p-bromophenyl)-1-desoxy-arabinuronolactone,
1,1-di-(p-bromophenyl)-1-desoxy-arabinuronolactone,
1-(p-bromophenyl)-1-desoxy-riburonolactone,
1,1-di-(p-bromophenyl)-1-desoxy-riburonolactone,
1-(p-bromophenyl)-1-desoxy-taluronolactone,
1,1-di-(p-bromophenyl)-1-desoxy-taluronolactone, 1-(p-bromophenyl)-1-desoxy-galacturonolactone,
1,1-di-(p-bromophenyl)-1-desoxy-galacturonolactone,
1-(p-bromophenyl-1-desoxy-iduronolactone,
1,1-di-(p-bromophenyl)-1-desoxy-iduronolactone,
1-(p-bromophenyl)-1-desoxy-guluronolactone,
1,1-di-(p-bromophenyl)-1-desoxy-guluronolactone,
1-(p-bromophenyl)-1-desoxy-mannuronolactone,
1,1-di-(p-bromophenyl)-1-desoxy-mannuronolactone,
1-(p-bromophenyl)-1-desoxy-glucuronolactone,
1,1-di-(p-bromophenyl)-1-desoxy-glucuronolactone,
1-(p-bromophenyl)-1-desoxy-altruronolactone,
1,1-di-(p-bromophenyl)-1-desoxy-altruronolactone,
1-(p-bromophenyl)-1-desoxy-alluronolactone,
1,1-di-(p-bromophenyl)-1-desoxy-alluronolactone,
1-(2,5-dichlorophenyl)-1-desoxy-lyxuronolactone,
1,1-di-(2,5-dichlorophenyl)-1-desoxy-lyxuronolactone,
1-(2,5-dichlorophenyl)-1-desoxy-xyluronolactone,
1,1-di-(2,5-dichlorophenyl)-1-desoxy-xyluronolactone,
1-(2,5-dichlorophenyl)-1-desoxy-arabinuronolactone,
1,1-di-(2,5-dichlorophenyl)-1-desoxy-arabinuronolactone,
1-(2,5-dichlorophenyl)-1-desoxy-riburonolactone,
1,1-di-(2,5-dichlorophenyl)-1-desoxy-riburonolactone,
1-(2,5-dichlorophenyl)-1-desoxy-taluronolactone,
1,1-di-(2,5-dichlorophenyl)-1-desoxy-taluronolactone,
1-(2,5-dichlorophenyl)-1-desoxy-galacturonolactone,
1,1-di-(2,5-dichlorophenyl)-1-desoxy-galaturonolactone,
1-(2,5-dichlorophenyl)-1-desoxy-iduronolactone,
1,1-di-(2,5-dichlorophenyl)-1-desoxy-iduronolactone,
1-(2,5-dichlorophenyl)-1-desoxy-guluronolactone,
1,1-di-(2,5-dichlorophenyl)-1-desoxy-guluronolactone,
1-(2,5-dichlorophenyl)-1-desoxy-mannuronolactone,
1,1-di-(2,5-dichlorophenyl)-1-desoxy-mannuronolactone,
1-(2,5-dichlorophenyl)-1-desoxy-glucuronolactone,
1,1-di-(2,5-dichlorophenyl)-1-desoxy-glucuronolactone,
1-(2,5-dichlorophenyl)-1-desoxy-altruronolactone,
1,1-di-(2,5-dichlorophenyl)-1-desoxy-altruronolactone,
1-(2,5-dichlorophenyl)-1-desoxy-alluronolactone,
1,1-di-(2,5-dichlorophenyl)-1-desoxy-alluronolactone,
1-(3,4-dichlorophenyl)-1-desoxy-lyxuronolactone,
1,1-di-(3,4-dichlorophenyl)-1-desoxy-lyxuronolactone,
1-(3,4-dichlorophenyl)-1-desoxy-xyluronolactone,
1,1-di-(3,4-dichlorophenyl)-1-desoxy-xyluronolactone,
1-(3,4-dichlorophenyl)-1-desoxy-arabinuronolactone,
1,1-di-(3,4-dichlorophenyl)-1-desoxy-arabinuronolactone,
1-(3,4-dichlorophenyl)-1-desoxy-riburonolactone,
1,1-di-(3,4-dichlorophenyl)-1-desoxy-riburonolactone,
1-(3,4-dichlorophenyl)-1-desoxy-taluronolactone,
1,1-di-(3,4-dichlorophenyl)-1-desoxy-taluronolactone,
1-(3,4-dichlorophenyl)-1-desoxy-galacturonolactone,
1,1-di-(3,4-dichlorophenyl)-1-desoxy-galacturonolactone,
1-(3,4-dichlorophenyl)-1-desoxy-iduronolactone,
1,1-di-(3,4-dichlorophenyl)-1-desoxy-iduronolactone,
1-(3,4-dichlorophenyl)-1-desoxy-guluronolactone,
1,1-di-(3,4-dichlorophenyl)-1-desoxy-guluronolactone,
1-(3,4-dichlorophenyl)-1-desoxy-mannuronolactone,
1,1-di-(3,4-dichlorophenyl)-1-desoxy-mannuronolactone,
1-(3,4-dichlorophenyl)-1-desoxy-glucuronolactone,
1,1-di-(3,4-dichlorophenyl)-1-desoxy-glucuronolactone,
1-(3,4-dichlorophenyl)-1-desoxy-altruronolactone,
1,1-di-(3,4-dichlorophenyl)-1-desoxy-altruronolactone,
1-(3,4-dichlorophenyl)-1-desoxy-alluronolactone,
1,1-di-(3,4-dichlorophenyl)-1-desoxy-alluronolactone,
1-(p-chlorophenyl)-1-desoxy-lyxuronic acid,
1,1-di-(p-chlorophenyl)-1-desoxy-lyxuronic acid,
1-(p-chlorophenyl)-1-desoxy-xyluronic acid,
1,1-di-(p-chlorophenyl)-1-desoxy-xyluronic acid,
1-(p-chlorophenyl)-1-desoxy-arabinuronic acid,
1,1-(p-chlorophenyl)-1-desoxy-arabinuronic acid,
1-(p-chlorophenyl)-1-desoxy-riburonic acid,
1,1-di-(p-chlorophenyl)-1-desoxy-riburonic acid,
1-(p-chlorophenyl)-1-desoxy-taluronic acid,
1,1-di-(p-chlorophenyl)-1-desoxy-taluronic acid,
1-(p-chlorophenyl)-1-desoxy-galacturonic acid,
1,1-di-(p-chlorophenyl)-1-desoxy-galacturonic acid,
1-(p-chlorophenyl)-1-desoxy-iduronic acid,
1,1-di-(p-chlorophenyl)-1-desoxy-iduronic acid,
1-(p-chlorophenyl)-1-desoxy-guluronic acid,
1,1-di-(p-chlorophenyl)-1-desoxy-guluronic acid,
1-(p-chlorophenyl)-1-desoxy-mannuronic acid,
1,1-di-(p-chlorophenyl)-1-desoxy-mannuronic acid,
1-(p-chlorophenyl)-1-desoxy-glucuronic acid,
1,1-di-(p-chlorophenyl)-1-desoxy-glucuronic acid,
1-(p-chlorophenyl)-1-desoxy-altruronic acid,
1,1-di-(p-chlorophenyl)-1-desoxy-altruronic acid,
1-(p-chlorophenyl)-1-desoxy-alluronic acid,
1,1-di-(p-chlorophenyl)-1-desoxy-alluronic acid,
1-(p-bromophenyl)-1-desoxy-lyxuronic acid,
1,1-di-(p-bromophenyl)-1-desoxy-lyxuronic acid,
1-(p-bromophenyl)-1-desoxy-xyluronic acid,
1,1-di-(p-bromophenyl)-1-desoxy-xyluronic acid,
1-(p-bromophenyl)-1-desoxy-arabinuronic acid,
1,1-di-(p-bromophenyl)-1-desoxy-arabinuronic acid,
1-(p-bromophenyl)-1-desoxy-riburonic acid,
1,1-di-(p-bromophenyl)-1-desoxy-riburonic acid,
1-(p-bromophenyl)-1-desoxy-taluronic acid,
1,1-di-(p-bromophenyl)-1-desoxy-taluronic acid,
1-(p-bromophenyl)-1-desoxy-galacturonic acid,
1,1-di-(p-bromophenyl)-1-desoxy-galacturonic acid,
1-(p-bromophenyl) 1-desoxy-iduronic acid,
1,1-di-(p-bromophenyl)-1-desoxy-iduronic acid,
1-(p-bromophenyl)-1-desoxy-guluronic acid,
1,1-di-(p-bromophenyl)-1-desoxy-guluronic acid,
1-(p-bromophenyl)-1-desoxy-mannuronic acid,
1,1-di-(p-bromophenyl)-1-desoxy-mannuronic acid,
1-(p-bromophenyl)-1-desoxy-glucuronic acid,
1,1-di-(p-bromophenyl)-1-desoxy-glucuronic acid,
1-(p-bromophenyl)-1-desoxy-altruronic acid,
1,1-di-(p-bromophenyl)-1-desoxy-altruronic acid,
1-(p-bromophenyl)-1-desoxy-alluronic acid,
1,1-di-(p-bromophenyl)-1-desoxy-alluronic acid,
1-(2,5-dichlorophenyl)-1-desoxy-lyxuronic acid,
1,1-di-(2,5-dichlorophenyl)-1-desoxy-lyxuronic acid,
1-(2,5-dichlorophenyl)-1-desoxy-xyluronic acid,
1,1-di-(2,5-dichlorophenyl)-1-desoxy-xyluronic acid,
1-(2,5-dichlorophenyl)-1-desoxy-arabinuronic acid,
1,1-di-(2,5-dichlorophenyl)-1-desoxy-arabinuronic acid,
1-(2,5-dichlorophenyl)-1-desoxy-riburonic acid,
1,1-di-(2,5-dichlorophenyl)-1-desoxy-riburonic acid,
1-(2,5-dichlorophenyl)-1-desoxy-taluronic acid,
1,1-di-(2,5-dichlorophenyl)-1-desoxy-taluronic acid,
1-(2,5-dichlorophenyl)-1-desoxy-galacturonic acid,
1,1-di-(2,5-dichlorophenyl)-1-desoxy-galacturonic acid,
1-(2,5-dichlorophenyl)-1-desoxy-iduronic acid,
1,1-di-(2,5-dichlorophenyl)-1-desoxy-iduronic acid,
1-(2,5-dichlorophenyl)-1-desoxy-guluronic acid,
1,1-di-(2,5-dichlorophenyl)-1-desoxy-guluronic acid,
1-(2,5-dichlorophenyl)-1-desoxy-mannuronic acid,
1,1-di-(2,5-dichlorophenyl)-1-desoxy-mannuronic acid,
1-(2,5-dichlorophenyl)-1-desoxy-glucuronic acid,
1,1-di-(2,5-dichlorophenyl)-1-desoxy-glucuronic acid,
1-(2,5-dichlorophenyl)-1-desoxy-altruronic acid,
1,1-di-(2,5-dichlorophenyl)-1-desoxy-altruronic acid,
1-(2,5-dichlorophenyl)-1-desoxy-alluronic acid,
1,1-di-(2,5-dichlorophenyl)-1-desoxy-alluronic acid,
1-(3,4-dichlorophenyl)-1-desoxy-lyxuronic acid,
1,1-di-(3,4-dichlorophenyl)-1-desoxy-lyxuronic acid,
1-(3,4-dichlorophenyl)-1-desoxy-xyluronic acid,
1,1-di-(3,4-dichlorophenyl)-1-desoxy-xyluronic acid,
1-(3,4-dichlorophenyl)-1-desoxy-arabinuronic acid,
1,1-di-(3,4-dichlorophenyl)-1-desoxy-arabinuronic acid,
1-(3,4-dichlorophenyl)-1-desoxy-riburonic acid,
1,1-di-(3,4-dichlorophenyl)-1-desoxy-riburonic acid,
1-(3,4-dichlorophenyl)-1-desoxy-taluronic acid,
1,1-di-(3,4-dichlorophenyl)-1-desoxy-taluronic acid,
1-(3,4-dichlorophenyl)-1-desoxy-galacturonic acid,
1,1-di(3,4-dichlorophenyl)-1-desoxy-galacturonic acid,
1-(3,4-dichlorophenyl)-1-desoxy-iduronic acid,
1,1-di-(3,4-dichlorophenyl)-1-desoxy-iduronic acid,
1-(3,4-dichlorophenyl)-1-desoxy-guluronic acid,
1,1-di-(3,4-dichlorophenyl)-1-desoxy-guluronic acid, 1-(3,4-dischlorophenyl)-1-desoxy-mannuronic acid,
1,1-di-(3,4-dichlorophenyl)-1-desoxy-mannuronic acid,
1-(3,4-dichlorophenyl)-1-desoxy-glucuronic acid,
1,1-di-(3,4-dichlorophenyl)-1-desoxy-glucuronic acid,
1-(3,4-dichlorophenyl)-1-desoxy-altruronic acid,
1,1-di-(3,4-dichlorophenyl)-1-desoxy-altruronic acid,
1-(3,4-dichlorophenyl)-1-desoxy-alluronic acid,
1,1-di-(3,4-dichlorophenyl)-1-desoxy-alluronic acid,
the sodium salt of 1-(p-chlorophenyl)-1-desoxy-lyxuronic acid,
the sodium salt of 1,1-di-(p-chlorophenyl)-1-desoxy-lyxuronic acid,
the sodium salt of 1-(p-chlorophenyl)-1-desoxy-xyluronic acid,
the sodium salt of 1,1-di-(p-chlorophenyl)-1-desoxy-xyluronic acid,
the sodium salt of 1-(p-chlorophenyl)-1-desoxy-arabinuronic acid,
the sodium salt of 1-(p-chlorophenyl)-1-desoxy-arabinuronic acid,
the sodium salt of 1-(p-chlorophenyl)-1-desoxy-riburonic acid,
the sodium salt of 1,1-di-(p-chlorophenyl)-1-desoxy-riburonic acid,
the sodium salt of 1-(p-chlorophenyl)-1-desoxy-taluronic acid,
the sodium salt of 1,1-di-(p-chlorophenyl)-1-desoxy-taluronic acid,
the sodium salt of 1-(p-chlorophenyl)-1-desoxy-galacturonic acid,
the sodium salt of 1,1-di-(p-chlorophenyl)-1-desoxy-galacturonic acid,
the sodium salt of 1-(p-chlorophenyl)-1-desoxy-iduronic acid,
the sodium salt of 1,1-di-(p-chlorophenyl)-1-desoxy-iduronic acid,
the sodium salt of 1-(p-chlorophenyl)-1-desoxy-guluronic acid,
the sodium salt of 1,1-di-(p-chlorophenyl)-1-desoxy-guluronic acid,
the sodium salt of 1-(p-chlorophenyl)-1-desoxy-mannuronic acid,
the sodium salt of 1,1-di-(p-chlorophenyl)-1-desoxy-mannuronic acid,
the sodium salt of 1-(p-chlorophenyl)-1-desoxy-glucuronic acid,
the sodium salt of 1,1-di-(p-chlorophenyl)-1-desoxy-glucuronic acid,
the sodium salt of 1-(p-chlorophenyl)-1-desoxy-altruronic acid,
the sodium salt of 1,1-di-(p-chlorophenyl)-1-desoxy-altruronic acid,
the sodium salt of 1-(p-chlorophenyl)-1-desoxy-alluronic acid,
the sodium salt of 1,1-di-(p-chlorophenyl)-1-desoxy-alluronic acid,
the sodium salt of 1-(p-bromophenyl)-1-desoxy-lyxuronic acid,
the sodium salt of 1,1-di-(p-bromophenyl)-1-desoxy-lyxuronic acid,
the sodium salt of 1-(p-bromophenyl)-1-desoxy-xyluronic acid,
the sodium salt of 1,1-di-(p-bromophenyl)-1-desoxy-xyluronic acid,
the sodium salt of 1-(p-bromophenyl)-1-desoxy-arabinuronic acid,
the sodium salt of 1,1-di-(p-bromophenyl)-1-desoxy-arabinuronic acid,
the sodium salt of 1-(p-bromophenyl)-1-desoxy-riburonic acid,
the sodium salt of 1,1-di-(p-bromophenyl)-1-desoxy-riburonic acid,
the sodium salt of 1-(p-bromophenyl)-1-desoxy-taluronic acid,
the sodium salt of 1,1-di-(p-bromophenyl)-1-desoxy-taluronic acid,
the sodium salt of 1-(p-bromophenyl)-1-desoxy-galacturonic acid,
the sodium salt of 1,1-di-(p-bromophenyl)-1-desoxy-galacturonic acid,
the sodium salt of 1-(p-bromophenyl)-1-desoxy-iduronic acid,
the sodium salt of 1,1-di-(p-bromophenyl)-1-desoxy-iduronic acid,
the sodium salt of 1-(p-bromophenyl)-1-desoxy-guluronic acid,
the sodium salt of 1,1-di-(p-bromophenyl)-1-desoxy-guluronic acid,
the sodium salt of 1-(p-bromophenyl)-1-desoxy-mannuronic acid,
the sodium salt of 1,1-di-(p-bromophenyl)-1-desoxy-mannuronic acid,
the sodium salt of 1-(p-bromophenyl)-1-desoxy-glucuronic acid,
the sodium salt of 1,1-di-(p-bromophenyl)-1-desoxy-glucuronic acid,
the sodium salt of 1-(p-bromophenyl)-1-desoxy-altruronic acid,
the sodium salt of 1,1-di-(p-bromophenyl)-1-desoxy-altruronic acid,
the sodium salt of 1-(p-bromophenyl)-1-desoxy-alluronic acid,
the sodium salt of 1,1-di-(p-bromophenyl)-1-desoxy-alluronic acid,
the sodium salt of 1-(2,5-dichlorophenyl)-1-desoxy-lyxuronic acid,
the sodium salt of 1,1-di-(2,5-dichlorophenyl)-1-desoxy-lyxuronic acid,
the sodium salt of 1-(2,5-dichlorophenyl)-1-desoxy-xyluronic acid,
the sodium salt of 1,1-di-(2,5-dichlorophenyl)-1-desoxy-xyluronic acid,
the sodium salt of 1-(2,5-dichlorophenyl)-1-desoxy-arabinuronic acid,
the sodium salt of 1,1-di-(2,5-dichlorophenyl)-1-desoxy-arabinuronic acid,
the sodium salt of 1-(2,5-dichlorophenyl)-1-desoxy-riburonic acid,
the sodium salt of 1,1-di-(2,5-dichlorophenyl)-1-desoxy-riburonic acid,
the sodium salt of 1-(2,5-dichlorophenyl)-1-desoxy-taluronic acid,
the sodium salt of 1,1-di-(2,5-dichlorophenyl)-1-desoxy-taluronic acid,
the sodium salt of 1-(2,5-dichlorophenyl)-1-desoxy-galacturonic acid,
the sodium salt of 1,1-di-(2,5-dichlorophenyl)-1-desoxy-galacturonic acid,
the sodium salt of 1-(2,5-dichlorophenyl)-1-desoxy-iduronic acid,
the sodium salt of 1,1-di-(2,5-dichlorophenyl)-1-desoxy-iduronic acid,
the sodium salt of 1-(2,5-dichlorophenyl)-1-desoxy-guluronic acid,
the sodium salt of 1,1-di-(2,5-dichlorophenyl)-1-desoxy-guluronic acid,
the sodium salt of 1-(2,5-dichlorophenyl)-1-desoxy-mannuronic acid,
the sodium salt of 1,1-di-(2,5-dichlorophenyl)-1-desoxy-mannuronic acid,
the sodium salt of 1-(2,5-dichlorophenyl)-1-desoxy-glucuronic acid,
the sodium salt of 1,1-di-(2,5-dichlorophenyl)-1-desoxy-glucuronic acid,
the sodium salt of 1-(2,5-dichlorophenyl)-1-desoxy-altruronic acid,
the sodium salt of 1,1-di-(2,5-dichlorophenyl)-1-desoxy-altruronic acid, the sodium salt of 1-(2,5-dichlorophenyl)-1-desoxy-alluronic acid,
the sodium salt of 1,1-di-(2,5-dichlorophenyl)-1-desoxy-alluronic acid,
the sodium salt of 1-(3,4-dichlorophenyl)-1-desoxy-lyxuronic acid,
the sodium salt of 1,1-di-(3,4-dichlorophenyl)-1-desoxy-lyxuronic acid,
the sodium salt of 1-(3,4-dichlorophenyl)-1-desoxy-xyluronic acid,
the sodium salt of 1,1-di-(3,4-dichlorophenyl)-1-desoxy-xyluronic acid,
the sodium salt of 1-(3,4-dichlorophenyl)-1-desoxy-arabinuronic acid,
the sodium salt of 1,1-di-(3,4-dichlorophenyl)-1-desoxy-arabinuronic acid,
the sodium salt of 1-(3,4-dichlorophenyl)-1-desoxy-riburonic acid,
the sodium salt of 1,1-di-(3,4-dichlorophenyl)-1-desoxy-riburonic acid,
the sodium salt of 1-(3,4-dichlorophenyl)-1-desoxy-taluronic acid,
the sodium salt of 1,1-di-(3,4-dichlorophenyl)-1-desoxy-taluronic acid,
the sodium salt of 1-(3,4-dichlorophenyl)-1-desoxy-galacturonic acid,
the sodium salt of 1,1-di-(3,4-dichlorophenyl)-1-desoxy-galacturonic acid,
the sodium salt of 1-(3,4-dichlorophenyl)-1-desoxy-iduronic acid,
the sodium salt of 1,1-di-(3,4-dichlorophenyl)-1-desoxy-iduronic acid,
the sodium salt of 1-(3,4-dichlorophenyl)-1-desoxy-guluronic acid,
the sodium salt of 1,1-di-(3,4-dichlorophenyl)-1-desoxy-guluronic acid,
the sodium salt of 1-(3,4-dichlorophenyl)-1-desoxy-mannuronic acid,
the sodium salt of 1,1-di-(3,4-dichlorophenyl)-1-desoxy-mannuronic acid,
the sodium salt of 1-(3,4-dichlorophenyl)-1-desoxy-glucuronic acid,
the sodium salt of 1,1-di-(3,4-dichlorophenyl)-1-desoxy-glucuronic acid,
the sodium salt of 1-(3,4-dichlorophenyl)-1-desoxy-altruronic acid,
the sodium salt of 1,1-di-(3,4-dichlorophenyl)-1-desoxy-altruronic acid,
the sodium salt of 1-(3,4-dichlorophenyl)-1-desoxy-alluronic acid,
the sodium salt of 1,1-di-(3,4-dichlorophenyl)-1-desoxy-alluronic acid.

Friedel-Crafts metal halide catalysts which are employed in this process are used in substantially anhydrous form, or modified by means of an alcohol, an ether, an ester, a nitroparaffin, etc. to give a catalyst of controlled activity, if so desired. A Friedel-Crafts metal halide catalyst which is preferred for use in this process is substantially anhydrous aluminum chloride. Other Friedel-Crafts metal halides which may be utilized as catalysts in this process, but not necessarily with equivalent results, are aluminum bromide, ferric chloride, ferric bromide, zinc chloride, beryllium chloride, gallium chloride, titanium tetrachloride, zirconium chloride, stannic chloride, etc.

The process may be carried out by slowly adding a Friedel-Crafts metal halide catalyst such as aluminum chloride to a stirred mixture of aryl halide and sugar acid lactone while maintaining the reaction temperature at from about −20° C. to about 150° C., and preferably at from about 20° C. to about 100° C. After the reaction mixture has reached the desired degree of reaction or completion, the entire reaction mixture and catalyst may be mixed with water or may be added to ice in order to quench the activity of the catalyst and to permit separation of the organic reaction product and unreacted starting materials.

The nature of this invention is illustrated further by the following example, which however should not be construed to limit unduly the generally broad scope of the invention.

EXAMPLE I

A one liter glass alkylation flask, equipped with a mercury sealed stirrer and a reflux condenser connected to a soda lime tower was charged with 25 grams of glucuronolactone, 333 grams of chlorobenzene and 100 grams of aluminum chloride. The flask was then heated on a water bath for 4.5 hours at 70–75° C. during which time 22 grams of hydrogen chloride was evolved as measured by the increase in the weight of the soda lime tower.

The contents of the alkylation flask were then treated with ice to decompose the aluminum chloride remaining therein. Ether was added to the system, making a homogeneous phase together with the product and excess chlorobenzene. This phase was washed with water and evaporated over steam to a dry solid weighing 59 grams and hereinafter designated as product A. The aqueous washes were neutralized with sodium hydroxide solution and evaporated to dryness. No organic residue was noted in the dry salt.

Segment A was placed in about 200 cc. of water, and solid sodium hydroxide was added until the solution was definitely alkaline. This was heated to boiling, filtered (less than 5% remained insoluble), and the filtrate kept at 10° C. for three days. At this point, a large precipitate of the sodium salt of the product had separated out in the flask. This solid product was filtered off and dried.

The sodium salt was then converted into the free acid product by dissolving the sodium salt in hot water, filtering, and then acidifying the filtrate with hydrochloric acid. The free acid separated as a light yellow oil. This oil crystallized slowly over a period of 3–4 days yielding more than 34 grams of lactone hereinafter designated as product B.

Data about the lactone, B, follows:
It could be crystallized from water in which its solubility was less than 0.1% at boiling point. The crystals were in the form of plates which, after drying at 25° C., had a melting point of 78–80°.

| Elementary Analysis | Percent | | |
|---|---|---|---|
| | C | H | Cl |
| Found | 52.83 | 4.68 | 17.32 |
| Calcd. for $C_{12}H_{10}O_5Cl_2 + 3/2 H_2O$* | 52.69 | 4.67 | 17.29 |

*Sesquihydrate of dichlorophenyl-desoxyglucuronolactone.

These crystalline plates, upon drying at 98° C. lost water and gave a crystalline material with melting point 108–110° C. analyzing as follows:

| | Percent | | |
|---|---|---|---|
| | C | H | Cl |
| Found | 53.91 | 4.50 | 17.40 |
| Calcd. for $C_{12}H_{10}O_5 \cdot H_2O$* | 53.88 | 4.52 | 17.68 |

*Monohydrate of dichlorophenyldesoxy-glucuronolactone.

Oxidation with chromic acid:
Chromic acid oxidation gave 4,4′-dichlorobenzophenone identified by its melting point and unchanged mixed melting point with pure reference compound.

Conversion to sodium salt:

When one gram of the lactone was placed in 10 cc. of water and neutralized with NaOH, it first dissolved and then immediately precipitated out as the sodium salt.

Properties of sodium salt:

Tiny needle crystals; melting point near 210° C. with decomposition; slightly soluble in water to give foamy solution.

| Elementary analysis | Percent Cl |
|---|---|
| Found | 14.29 |
| Calcd. for $C_{18}H_{17}O_6NaCl_2 \cdot 4H_2O$ | 14.32 |

These data show that the following condensation occurred in the presence of $AlCl_3$:

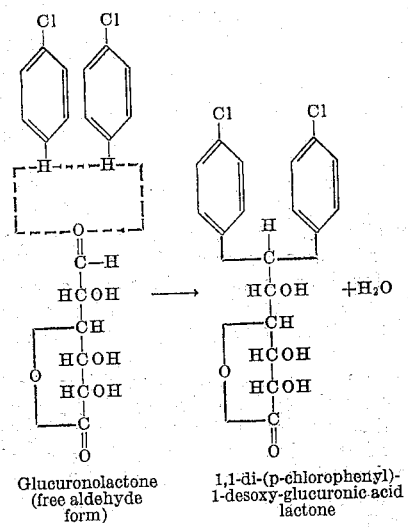

Glucuronolactone (free aldehyde form)     1,1-di-(p-chlorophenyl)-1-desoxy-glucuronic acid lactone The product is regarded as the lactone rather than as the free acid of structure:

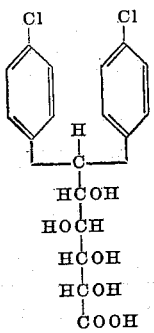

because of the high degree of water insolubility. A structure such as the latter would be expected to be much more water-soluble than the observed value of around 0.1% at 100° C. Either the free acid or the lactone will dissolve in diluted sodium hydroxide to give the sodium salt:

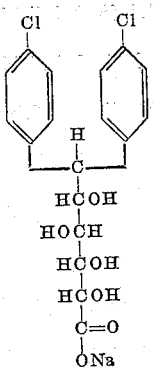

Sodium salt of 1,1-di-(p-chlorophenyl)-1-desoxy-glucuronic acid

The observed yield of 34 grams of the diarylated lactone was 60% of the theoretical and represented an exceptionally high yield of a pure reaction product.

Eight grams of the thus prepared 1,1-di-(p-chlorophenyl)-1-desoxy-glucuronolactone and six grams of the methyl ester of stearic acid are dissolved in 100 ml. of dimethylformamide and the resultant mixture is heated to 100° C. About one gram of $K_2CO_3$ is added and a vacuum of 100 mm. is applied to the system. The system is stirred for six hours at 100° C. during which time about 1 gm. of methanol distills out. Stirring is stopped, and the dimethylformamide is distilled out. The dry product, about 12 grams, is suitable for use as a nonionic detergent with germicidal properties. It can be built with sodium tripolyphosphate to yield a foaming detergent, or utilized per se for clothes washing.

We claim as our invention:

1. A compound selected from the group consisting of haloaryl-1-desoxy-alduronolactone, haloaryl-1-desoxy-alduronic acid, and a sodium salt of haloaryl-1-desoxy-alduronic acid.
2. Halophenyl-1-desoxy-alduronolactone.
3. Halophenyl-1-desoxy-hexuronolactone.
4. Chlorophenyl-1-desoxy-hexuronolactone.
5. 1-(p-chlorophenyl)-1-desoxy-glucuronolactone.
6. 1,1-di-(p-chlorophenyl)-1-desoxy-glucuronolactone.
7. Halophenyl-1-desoxy-alduronic acid.
8. Halophenyl-1-desoxy-hexuronic acid.
9. Chlorophenyl-1-desoxy-hexuronic acid.
10. 1-(p-chlorophenyl)-1-desoxy-glucuronic acid.
11. 1,1-di-(p-chlorophenyl)-1-desoxy-glucuronic acid.
12. The sodium salt of halophenyl-1-desoxy-alduronic acid.
13. The sodium salt of halophenyl-1-desoxy-hexuronic acid.
14. The sodium salt of chlorophenyl-1-desoxy-hexuronic acid.
15. The sodium salt of 1-(p-chlorophenyl)-1-desoxy-glucuronic acid.
16. The sodium salt of 1,1-di-(p-chlorophenyl)-1-desoxy-glucuronic acid.

References Cited in the file of this patent

UNITED STATES PATENTS

| 2,472,276 | Bonner | June 7, 1949 |
| 2,798,098 | Linn | July 2, 1957 |
| 2,798,100 | Linn | July 2, 1957 |